Figure 1:
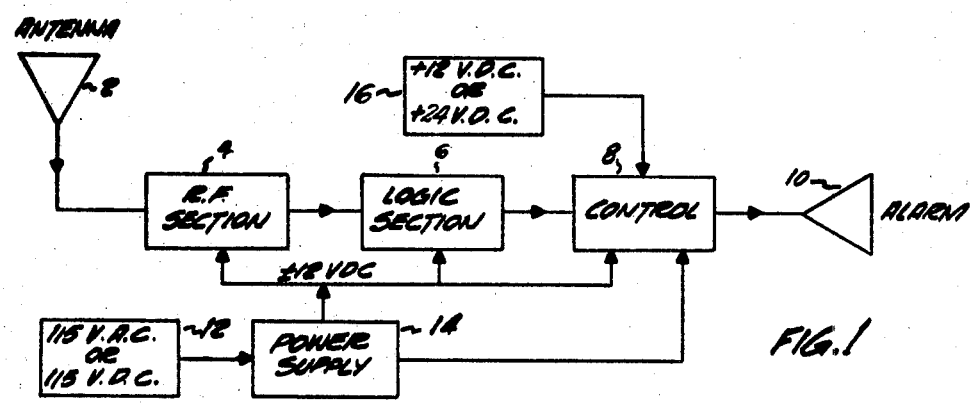

United States Patent

[11] 3,579,190

[72] Inventor Ernest C. Karras
 Chicago, Ill.
[21] Appl. No. 636,446
[22] Filed May 5, 1967
[45] Patented May 18, 1971
[73] Assignee International Telephone and Telegraph
 Corporation
 New York, N.Y.

[54] AUTOMATIC ALARM DETECTOR
 4 Claims, 3 Drawing Figs.
[52] U.S. Cl. .................................................. 340/167,
 340/164
[51] Int. Cl. ............................................... H04q 9/00
[50] Field of Search ...................................... 340/167,
 311, 164; 325/55, 64, 321, 325, 326

[56] References Cited
 UNITED STATES PATENTS
2,235,804 3/1941 MacAlpine .................. 340/164
2,564,692 8/1951 Hoeppner ................... 340/164
2,706,810 4/1955 Jacobsen ..................... 340/167
3,053,478 9/1962 Davenport et al. .......... 340/167X 3,114,142 12/1963 Bode et al. .................. 340/311
3,009,058 11/1961 Bodez ......................... 325/326
3,042,800 7/1962 Gluth .......................... 325/322X
3,332,018 7/1967 Thornberg et al. ........... 325/322
3,358,235 12/1967 Powell ........................ 325/64X Primary Examiner—Donald J. Yusko
Attorneys—C. Cornell Remsen, Jr., Rayson P. Morris, Percy P. Lantzy, J. Warren Whitesel, Philip A. Weiss and Delbert P. Warner ABSTRACT: A system is provided for unattended monitoring of international distress signals. The system employs an RF section which responds to all the signals in the frequency range of interest. The RF signals are fed through two analog-to-digital translators; one of which supplies a control signal to automatic gain control equipment to control amplification in the RF section and the other of which supplies DC pulses according to the intelligence in the original RF signals. The DC pulses are employed by logic circuits which provide an output signal if (1) at least 4 consecutive pulses are present, (2) the pulses are of duration between 3.5 seconds and 6 seconds, and (3) the pulses are separated by time intervals of between 10 milliseconds and 1.5 seconds duration.

RF SECTION OF AUTO ALARM

INVENTOR
EARNEST C. KARRAS
BY
Delbert P. Warner
ATTORNEY

3,579,190

AUTOMATIC ALARM DETECTOR

This invention relates to an automatic alarm detector primarily for shipboard installation. It will provide means for unattended monitoring of the International Calling and Distress frequency while the ship radio officer is off duty.

To fulfill various regulatory and treaty obligations, all ships at sea are required to monitor the International Calling and Distress frequency of 500 kHz. around the clock for the purpose of receiving distress calls. The signals being monitored are type A1 or A2 (unmodulated or modulated CW) with dashes being at least 3.5 seconds, but not greater than 6 seconds in duration and the spaces appearing between the dashes being at least 10 milliseconds (.01 second) but not more than 1.5 seconds in duration.

It is the primary object of the present invention to provide automatic means for determining whether signals of the prescribed frequency are present, for converting any such signals to digital form and for processing any digital pulses to determine whether a distress signal is, in fact, being received.

Figure 2:
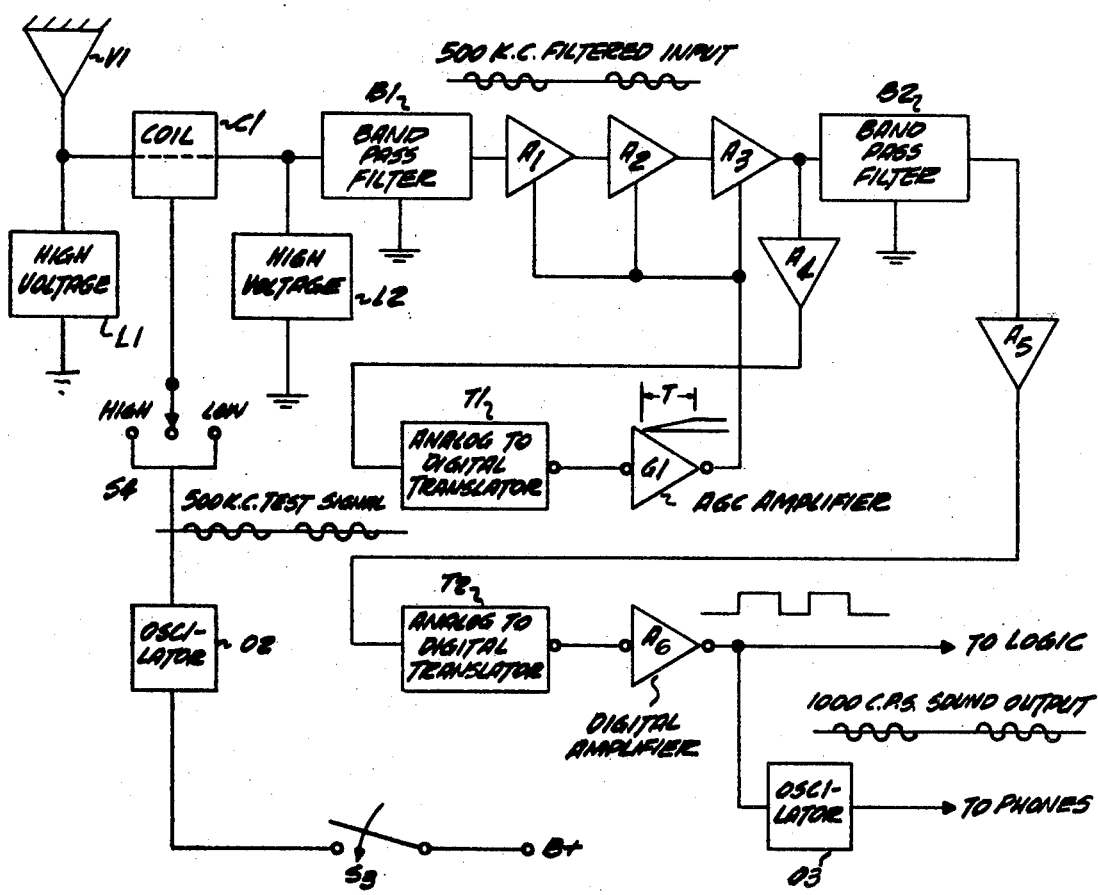
Figure 3:
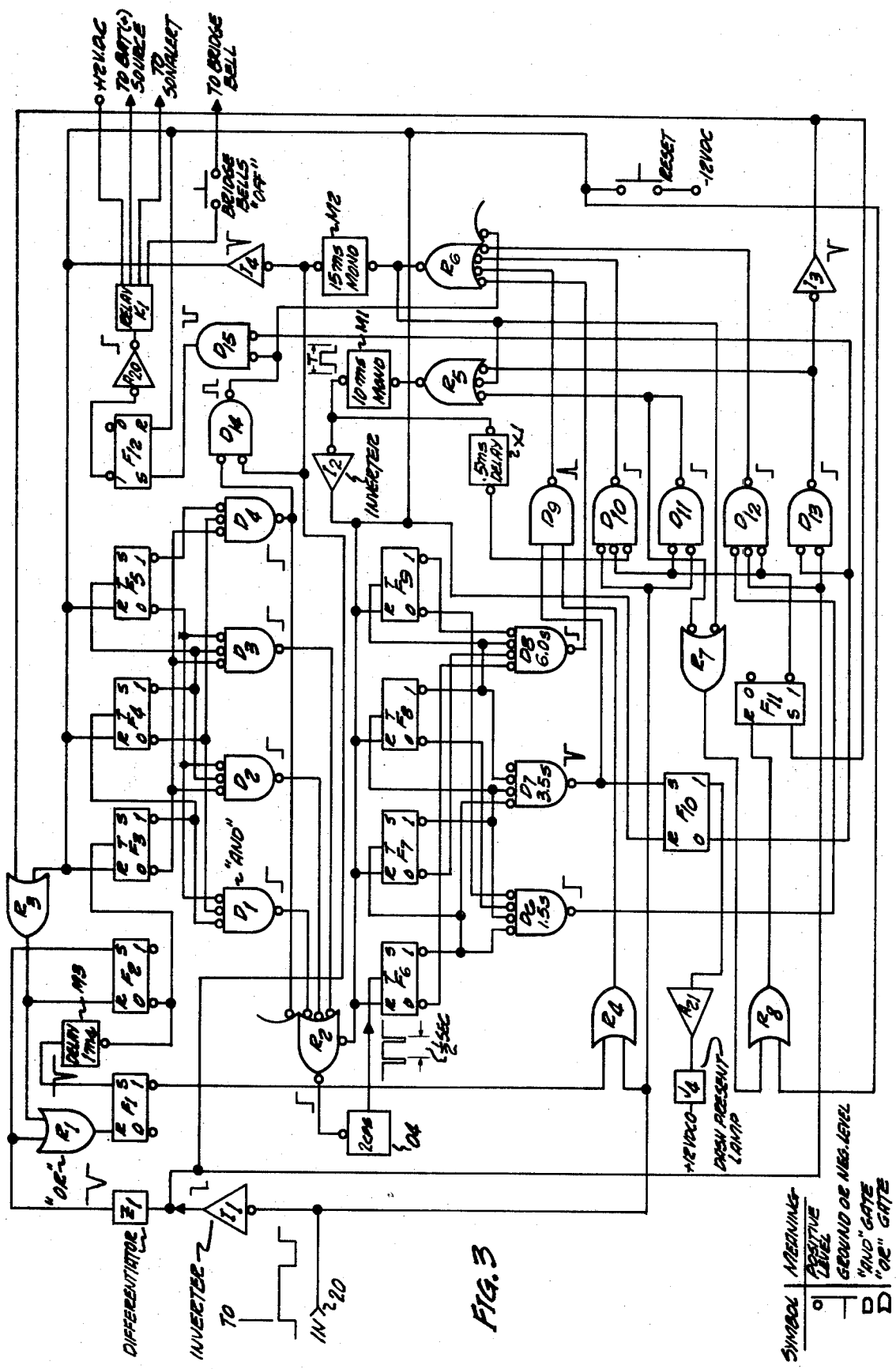

In order to attain the foregoing and related objectives, preferred embodiments of this invention have been devised as shown in the circuits illustrated in the attached drawings in which FIG. 1 is a block diagram of a complete monitoring system, FIG. 2 depicts a preferred RF circuit and FIG. 3 illustrates an exemplary logic system of use in the practice of the invention.

Turn first to FIG. 1 for a block diagram depicting an overall view of the system. A 500 kHz. ± 8 kHz. signal of magnitude 30 $\mu$v. or above appearing at the antenna 2 will be detected by the RF section 4 where it is filtered, amplified and translated from analog-to-digital form. The resulting digital information is fed into the logic section 6 where it is interrogated for the proper time durations. After the interrogation, the logic section will either cancel any active storage and reset the system or command the system to accept another burst of signal. If the duration between bursts is not less than 10 milliseconds and not more than 1.5 seconds ± 10 percent the second burst of signal will be allowed to advance the storage, otherwise the system will automatically reset to accept a new series of signals. After storing four valid signals at the end of the fourth burst, the logic will command the control section 8 to activate the audible alarm 10. After activation of the alarm, the system will continue to detect signals, but the internal and external alarms will remain energized until a Reset switch associated with the logic section (FIG. 3) is depressed. Power to the system can be derived from a 115 volt source 12 through a DC supply at 14. A standby battery supply at 16 is used to warn of system failures and to supply auxiliary power when needed.

The purpose of the RF circuit shown in FIG. 2 is to detect, amplify, control, discriminate and translate a 500 kHz. signal in the midst of similar transmissions and atmospheric interference.

Upon receiving a signal (30 $\mu$v. to 1 v. RMS) 6 db. above the existing noise level from the antenna $V_1$, the 500 kHz. band-pass filter $B_1$ eliminates all frequencies except those between 492 kHz. and 508 kHz. The remaining signal is then amplified by the RF amplifiers $A_1$, $A_2$, and $A_3$ to approximately 0.2 v. RMS. The amplified signal together with any accumulated white noise is further amplified by $A_4$ and $\mu_4$nto the analog to digital translator $T_1$.

The translator changes the 500 kHz. signal and noise into a DC level of approximately 4 v. DC The automatic gain control amplifier $G_1$ senses the translator'2, output and responds with a slowly rising output which takes approximately $t$ time or 15 minutes to reach its full value of ±10 v. DC when the antenna detection is 0.5 v. RMS. The output of $G_1$ feeds into $A_1$, $A_2$, and $A_3$ to decrease their voltage gains. This cycle will continue and $G_1$'s output will rise until a steady state is reached when $T_1$'s output is approximately +4 V. DC. If the signal is absent for any duration longer than 10 ms., $G_1$'s output will decrease back to a steady state level compatible with the existing incoming noise.

The signal output of $A_3$ also passes through the band-pass filter $B_2$ which eliminates any accumulated noise. The 500 kHz. ± 8 kHz. output of $B_2$ is further amplified by the RF amplifier $A_5$ and is fed into the analog to digital translator $T_2$. The DC output of approximately 4 v. DC of $T_2$ is detected and amplified by a digital amplifier A6 thus framing the input signal between the discrete levels of +12 v. DC and ground. The output of A6 operates the logic section of the receiver and also initiates a 1000 Hz. oscillator $0_3$ to provide a signal suitable to operate a device providing an audible indication of the presence of the 500 kHz. signal.

To test the operability of the receiver, the output of a 500 kHz. oscillator (02) is selected with switch $S_4$ and the required number and duration of dashes are initiated with switch $S_3$. The oscillator's output passes through coil $C_1$ which inductively couples the signal into the antenna lead thus simulating the 500 kHz. input.

Stray lightning radiation (200 v. AC and above) and high voltage atmospheric interference 3 v. AC to 200 v. AC are suppressed to ground by $L_1$ and $L_2$, respectively.

The general purpose of the logic circuit is to detect a DC signal consisting of 4 "valid" dashes and spaces and to initiate an audible alarm to indicate successful detection. Circuits have been incorporated to assure against pulse duplication or of too short or too long a dash duration, that is, the dashes must persist for more than 3.5 seconds but less than 6 seconds. Also, protection has been provided against spaces between dashes of less than 10 milliseconds or greater than 1.5 seconds.

First, consider the operation of the logic circuit when a sequence of valid dashes is received. In the presence of a positive signal at the IN lead 20 from the detector, inverter $I_1$ goes steady negative, differentiator $Z_1$ pulses negative to reset flip-flop $F_1$ via OR gate $R_1$, and also to set flip-flop $F_2$. The flip-flop $F_2$ initiates delay $M_3$ which after 1 millisecond pulses negative and sets $F_1$. Also, $F_2$ triggers flip-flop $F_3$. At this time, flip-flops $F_3$, $F_4$ and $F_5$ are arranged to satisfy the input requirements of AND gate $D_1$ which gates out a steady positive to OR gate $R_2$. At this time, Inverter $I_2$ is in the enabling state, consequently, $R_2$ gates out a steady positive to start oscillator $0_4$.

Upon receipt of the pulse from $R_2$, oscillator $O_4$ begins timing and every ½ second gates out a negative pulse. These pulses sequentially trigger flip-flops $F_6$, $F_7$, $F_8$ and $F_9$, which serve collectively as a timer-counter circuit. Upon occurrence of the third triggering pulse (1.5 seconds) AND gate $D_6$'s inputs are satisfied and it gates out a positive pulse for ½ second, thus partially enabling AND gate $D_{12}$. Gate $D_7$'s inputs are satisfied in 3.5 seconds and it pulses out a negative which sets flip-flop $F_{10}$ and partially enables AND gate $D_9$ the other input of which is inhibited. Flip-flop $F_{10}$ puts out a steady positive signal partially enabling AND gates $D_{13}$ and $D_{15}$ and a steady negative which activates amplifier $A_{21}$ thus illuminating the dash present lamp $J_4$.

If, at some time less than 2,5 seconds later (indicating a dash of less than 6 seconds), the positive at the IN lead goes to ground; the inputs of $D_{13}$ will be satisfied and it gates out a steady positive to OR gate $R_5$ and inverter $I_3$. $I_3$ pulses out a negative which resets $F_1$ and $F_2$ via OR gates $R_1$ and $R_3$ and sets flip-flop $F_{11}$. The positive output of $F_{11}$ partially enables AND gated $D_{10}$, $D_{11}$ and $D_{12}$ whose other inputs are disables. OR gate $R_5$ pulses out a positive which initiates the 10 milliseconds monostable multivibrator $M_1$ which gates out a positive to partially enable AND gate $D_{10}$ through delay $X_1$ and enables inverter $I_2$ to pulse out a negative which resets $F_6$, $F_7$, $F_8$, $F_9$, $F_{10}$, inhibits $R_2$ and resets $0_4$ to time T=0. The lamp $J_4$ extinguishes and the timer begins recounting.

After the 10 millisecond period ANd gate $D_{10}$ is disabled. A short time later (not more than 1.49 seconds) if the IN lead goes positive again, $I_1$ goes negative, $D_{11}$ goes positive to initiate the timer reset and as above the whole cycle repeats. As each cycle is begun the cycle counter, including flip-flop $F_2$, $F_3$, $F_4$ and $F_5$, is advanced until the end of the fourth cycle. At that time AND gate $D_4$ puts out a positive pulse enabling AND gate $D_{14}$. When the 4th dash ends, $I_1$ goes positive thus satisfying the input requirements of $D_{14}$, $D_{14}$'s positive output satisfies the inputs of AND gate $D_{15}$ which pulses out a negative setting flip-flop $F_{12}$ which activates amplifier $A_{20}$, which deactivates relay $K_1$ thus initiating the audible alarm signal. Simultaneously, the positive output from $D_{14}$ activates inverter $I_4$ via OR gate $R_6$ and monostable $M_2$ for 15 m.s. thus resetting the total system except for $F_{12}$. $F_{12}$ keeps the audible alarm activated until the reset switch is depressed to reset the total system including $F_{12}$.

The following discussions cover pertinent operation of the logic system in the event invalid signals have been detected by the RF system:

Multiple Pulses—If during the dash after time $T_0$ but before 3.5 seconds the signal disappears momentarily, upon its reappearance $I_1$ will go negative, $Z_1$ will pulse negative and $F_1$ will be reset via $R_1$. The negative output of $F_1$ will partially enable $D_9$ via $R_4$. When the timer-counter, including flip-flops $F_6$, $F_7$, $F_8$, and $F_9$, marks out 3.5 seconds via $D_7$, $D_9$'s inputs are fully satisfied and it pulses out a positive to $R_6$ which resets the total system back to $T_0$ and zero cycle count.

Too Short a Dash—If during the marking at 3.5 seconds by $D_7$ the IN lead is negative indicating too short a dash, $D_9$'s inputs are satisfied via $R_4$ and $D_7$, consequently it gates out a positive to $R_6$ and resets the total system back to time $T_0$ and zero cycle count.

Too Long a Dash—If during a positive signal the duration of said signal were to allow the timer to advance to a count of 6 seconds, $D_8$ would mark out a positive to $R_6$ which would initiate the resetting of the total system back to $T_0$ and zero count.

Too Short a Space—Immediately after the positive signal ends on lead IN $D_{10}$ is partially enabled by $M_1$ and $F_{11}$ for 10 milliseconds. If during this period the input lead IN were to go positive for any reason, $DD_{10}$'s inputs would be fully satisfied, and it would gate out a positive to $R_6$ thus resetting the total system back to $T_0$ and zero cycle count.

Too Long a Space—If during a space the duration of said space were to allow the timer to advance to a count of 1.5 seconds, $D_6$ would mark $D_{12}$ with a positive. Since $D_{12}$ is already partially enabled by the positive signal from the inverter $I_1$ and by the positive flip-flop $F_{11}$, it is fully satisfied, thus it pulses out a positive to $R_6$ and resets the total system back to $T_0$ and zero cycle count.

I claim:

1. An automatic system for monitoring pulse modulated RF distress signals and for providing an alarm when prescribed signals are received, wherein the improvement comprises:

an RF section for receiving RF signals within a prescribed bandwidth, said RF section including electronic means for converting the RF signals into DC pulses, a logic section for receiving said DC pulses, said logic section including a plurality of electronic circuits connected together to provide an output signal in response to the receipt of a selected number of consecutive pulses, having a prescribed length, which are separated by spaces of acceptable duration, said electronic circuits including first electronic means responsive to the start of one of said DC pulses to provide a trigger signal, an electronic cycle counter responsive to said trigger signal to record the beginning of a DC pulse and to provide output signals to energize a first AND gate, said energized AND gate providing a signal to energize an "OR" gate, an oscillator coupled to respond to signals from said OR gate to provide timed output pulses during the period of said DC pulse, a timer-counter circuit responsive to said sequences of timed pulses to measure the duration of said DC pulse, a plurality of gates coupled to said timer-counter circuit to provide output signals indicative of the status of the DC pulse, and gating means responsive to said output signals to provide further signals indicating when a DC pulse is of proper duration and supplying an inhibit signal to the OR gate causing it to turn off the oscillator, said cycle counter responding to succeeding trigger signals to advance its count by one and energize a second AND gate and said OR gate to start a second cycle of checking through said AND gates and said timer-counter circuit.

2. A system as claimed in claim 1, including means in said gating means to provide an inhibit signal to reset the first electronic means and said cycle counter to zero if the duration of said DC pulse falls outside prescribed limits.

3. A system as claimed in claim 1, including means in said gating means to provide an inhibit signal to reset the first electronic means and said cycle counter to zero if the period between DC pulse falls outside prescribed limits.

4. A system as claimed in claim 1, in which the electronic cycle counter advances one step on receipt of each trigger signal heralding the beginning of a DC pulse, and additional electronic gating means is provided to generate an alarm signal when said electronic cycle counter has counted four and the gating means produces a further signal indicating the fourth DC pulse is of proper duration.